Aug. 20, 1963
A. N. WELLS
3,100,985
APPARATUS FOR DETERMINING FLUID CHARACTERISTICS
Filed June 27, 1960
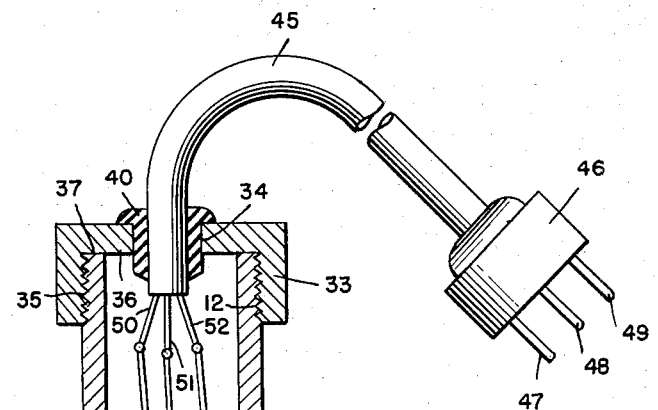
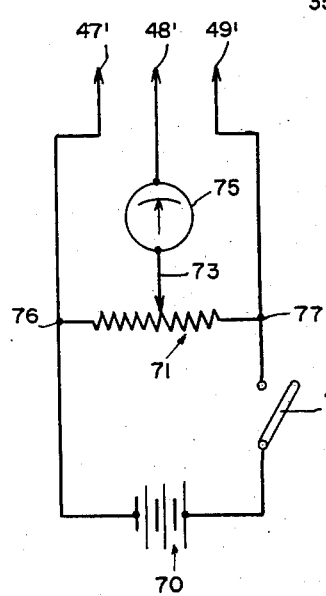
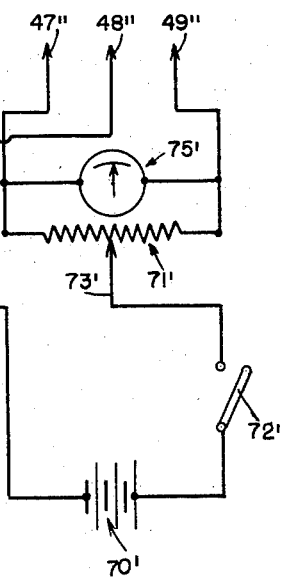
INVENTOR
Arthur N. Wells
BY *Shoemaker and Mattare*
ATTORNEYS

3,100,985
APPARATUS FOR DETERMINING FLUID CHARACTERISTICS
Arthur N. Wells, P.O. Box 696, Belmont, Calif.
Filed June 27, 1960, Ser. No. 38,869
8 Claims. (Cl. 73—27)

The present invention relates to new and novel apparatus for determining fluid characteristics, and more particularly to such apparatus employing the varying heat conductivity characteristic of fluid films formed on various surfaces of the apparatus.

The present invention is directed to apparatus which is particularly adapted to measure the gaseous content of liquids, or the moisture content of gases, as well as the general nature of the fluids. Such apparatus is useful for determining whether the films formed by hydrocarbon fluid tend to adsorb or absorb solution gases, and when used with gasoline, for example, there is a correlation between the measurement obtained with the present apparatus and the octane rating or value of the gasoline. Accordingly, this type of apparatus may be employed when it is desired to rapidly determine the quality of a hydrocarbon fuel.

Actually, the device determines by measuring relative heat conductivity on two surfaces of the apparatus, the filming properties of the particular fluid, these filming properties being governed by the amount of gas which may be adsorbed or absorbed in the case of a liquid or by the amount of moisture which may be present in the case where the fluid being measured is a gas.

For example, the apparatus may be employed for quickly determining whether a sample of distilled water is truly air-free, or to what degree air is present in the water. Obviously, the wetness content of any gas may be readily determined with this type of apparatus. Another application of the invention apparatus is to disclose the general nature of the films which are condensed from polluted atmosphere such as smog and the device will further indicate deviations of purity and quality of gases as well as atmospheric conditions. Furthermore, readings obtained with the present apparatus provide information relative to the filming characteristics of lubricating oils.

The apparatus includes a body means having two portions formed of different materials which provide boundary layer films of different characteristics thereon. The body means also includes a temperature-sensitive impedance means operatively associated with each of said body portions. An electrical network including a source of electrical energy and a measuring means is operatively connected with the impedance means. Variations in the heat conductivity of the condensed films on the two body portions will result in varying impedance of the temperature-sensitive impedance means. This varying impedance is employed in the electrical network to provide an indication of the varying degrees of heat conductivity in the fluid which reflects the characteristics of the fluid which it is desired to determine.

For example, if a liquid substance is to be examined, the deviations in readings obtained with the apparatus are due to the presence of minute globules of adsorbed or absorbed gas which accumulate in the film formed adjacent the two body portions of the apparatus. If the film is substantially homogeneous, it is a relatively good heat conductor, and on the other hand, if the film is charged with the aforementioned globules of gas, the film will have a relatively spongy texture which will cause the film to be a poor heat conductor. It is accordingly evident that as larger amounts of gas are present, the film adjacent to the two portions of the body means will be poorer heat conductors and accordingly the impedance of the variable impedance means will be altered thereby providing different readings from the measurement means of the associated electrical network.

In the present invention, a first portion of the body means is formed of a metallic substance and a second portion is formed of a non-metallic substance. The fluid adjacent the mental surface of the body means provides a boundary layer film of a different characteristic than the fluid adjacent the non-metal portion of the body means, and therefore, the heat passing from the different portions of the body means through the film layers into the surrounding fluid will flow at a different rate from each of the surfaces as modified by the nature or characteristics of the particular film layer. In this manner, the loss of heat from the temperature-sensitive impedance means provides them with a particular resistance value which is utilized for operating the measuring means as afore-described.

An object of the present invention is to provide apparatus for indicating whether the film of a hydrocarbon fluid tends to adsorb solution gases.

Another object of the invention is to provide apparatus for quickly disclosing whether a sample of distilled water is truly air-free, or to what degree it is air-free.

A further object of the invention is to measure the moisture content of a gas.

Still another object of the invention is the provision of apparatus for disclosing the characteristics of films which tend to condense from polluted atmosphere and to indicate the nature of residues from fluids, i.e., whether or not they are wet or dry, spongy or otherwise.

A still further object of the invention is to provide an apparatus for determining the filming characteristics of lubricating oil.

Yet another object of the invention is the provision of new and novel apparatus for accomplishing the above objects which is quite simple, compact and inexpensive in construction, and yet which is sturdy and reliable in operation.

Other objects and many attendant advantages will become more apparent when considered in connection with the specification and accompanying drawing wherein:

FIG. 1 is a longitudinal sectional view of one embodiment of the present invention;

FIG. 2 is a schematic illustration of an electrical network adapted to be connected with the apparatus shown in FIG. 1; and FIG. 3 is a schematic illustration of a modified electrical network for use with the device shown in FIG. 1.

Referring now to the drawing, there is shown in FIG. 1 the probe portion of the apparatus which is adapted to be inserted in a suitable body of fluid whether it be in a static condition or in a state of flow, the probe including a first substantially cylindrical body portion indicated generally by reference numeral 10 and a second body portion indicated by reference numeral 11 which is supported from the first body portion. Body portion 10 is preferably formed of metallic material such as stainless steel or the like which is a relatively good heat conductor. Body member 10 is open at the upper end thereof and is provided with screw threads 12 on the outer wall thereof adjacent the upper open end. A substantially cylindrical cavity 15 is provided within body portion 10 and is in communication with a bore 16 of reduced diameter which in turn communicates with a lower bore 17 of increased diameter as compared to bore 16. Bore 17 communicates with a still larger bore having screw threads 18 formed on the inner wall thereof, this last-mentioned bore opening through the lower end of body portion 10.

A recessed cavity 20 is disposed in communication with cavity 15 and is formed in the thick-walled portion 21 of body member 10.

The second body portion 11 is preferably formed of a non-metallic substance such as glass or a plastic, Teflon being a preferred form of plastic for the purposes of the present invention.

It is important to note that the boundary layer film of a fluid adjacent a metallic surface is of a different nature than the boundary layer film of a fluid adjacent a non-metallic surface whereby the boundary layer films adjacent the first and second body portions 10 and 11 will have different heat conductivity characteristics to cause the heat flow from the surfaces of these body portions to flow at different rates from the surfaces of different materials.

Body portion 11 is open at the upper end 25 thereof so as to be in communication with the hollow interior of body portion 10, the main portion of body portion 11 being tubular and the lower end thereof 27 being dome-shaped so as to close the lower end of the body portion 11. Screw threads 28 are formed on the outer surface of body portion 11 and adjacent the upper end thereof, these screw threads cooperating with threads 18 formed on body portion 10 for mounting and supporting the body portion 11 in operative relationship with body portion 10 and further to provide an effective seal therewith since the upper end edge 29 of body portion 11 seats against a shoulder 30 formed on body portion 10.

Disposed at the upper end of body portion 10 is a cap member 33 which is substantially cup-shaped in configuration, the cap member being provided with a central opening 34 formed through the end wall thereof and having screw threads 35 formed on the depending flange portion thereof, threads 35 cooperating with threads 12 on body portion 10 for mounting and supporting the end cap on body portion 10 and providing a seal therewith since the under surface 36 of the cap member 33 seats against the upper end edge 37 of body portion 10.

A conventional grommet 40 formed of rubber or similar material is inserted within opening 34 of the end cap and is provided with a bore therethrough which receives a conventional electrical cable 45 which has three electrical conductors disposed therein. Grommet 40 fits snugly within opening 34 and against cable 45 to ensure a fluid-tight connection between the cable and the end cap thereby maintaining the interior of the probe apparatus completely sealed at all times when the components thereof are in operative relationship as seen in FIG. 1.

Electrical cable 45 terminates at one end thereof in a conventional plug 46 having three prongs 47, 48, and 49 extending therefrom and connected to the electrical leads within the cable. The three electrical leads extend outwardly of the opposite terminal end of the cable and are indicated by reference numerals 50, 51 and 52. These electrical leads are in turn connected with the temperature-sensitive impedance means of the apparatus as hereinafter described.

A first temperature-sensitive impedance means indicated generally by reference numeral 60 is suitably mounted within body portion 11 and is disposed adjacent the lower end thereof as shown. Member 60 may be of any well-known construction wherein the resistance of the device varies with the temperature thereof.

For example, member 60 may comprise a ceramic resistor or a so-called thermistor, the characteristics of which are well-known. One terminal of member 60 is connected by lead 61 to lead 50 extending from the cable, and the opposite terminal of member 60 is connected by lead 62 to lead 51 of the electrical cable.

A second temperature-sensitive impedance means is indicated generally by reference numeral 65 and is suitably mounted within cavity 20 formed in body portion 10. Member 65 may be of similar construction to member 60, one terminal of member 65 being connected by lead 66 to lead 52 of the electrical cable and the other terminal of member 65 being connected by lead 67 to lead 62 and thereby is interconnected with lead 51 of the cable.

Referring now to FIG. 2 of the drawings, an electrical network is schematically illustrated which is adapted to cooperate with the device shown in FIG. 1. The electrical network includes a battery or other suitable source of electrical energy 70 which is connected in series with a potentiometer 71 through a switch 72, the adjustable arm 73 of the potentiometer being connected with an electrical meter 75 which may comprise a microammeter or similar device for measuring the amount of electrical current passing through the network. Terminals 47′, 48′ and 49′ indicate schematically connectors which are adapted to be connected with the prongs 47, 48 and 49 respectively of the plug 46. Terminal 48′ is connected with one terminal of the meter 75, the opposite terminal of which as aforementioned is connected with the arm 73 of the potentiometer.

Terminal 47′ is connected with terminal 76 at one side of the potentiometer 71 and terminal 49′ is connected with a terminal 77 at the other side of the potentiometer, it being evident that terminals 47′ and 49′ are connected directly with opposite sides of battery 70 when switch 72 is closed, switch 72 being employed merely for the purpose of selectively actuating the apparatus.

It is evident that the electrical network illustrated in FIG. 2 provides a source of electrical energy for energizing the temperature-sensitive impedance means 60 and 65 of the probe device, and further that a bridge circuit is provided for measuring the relative resistances of the impedance devices 60 and 65. In a typical example, battery 70 may be of 6 to 9 volts and potentiometer 71 may be of about 5000 ohms. The meter 75 may have a range of 50 microamperes and a resistance of about 2000 ohms. The temperature-sensitive resistors 60 and 65 may be in the 2000 to 5000 ohm range.

Referring now to FIG. 3 of the drawings, a modified electrical network is illustrated, this network including the identical components as seen in FIG. 2 which are interconnected in a slightly different manner, but which serve to provide the same end result in providing an indication of the relative resistances of the temperature-sensitive impedence means connected therewith. Terminals 47″ and 48″ and 49″ correspond to the terminals 47′, 48′ and 49′ shown in FIG. 2, and will also comprise connector means adapted to be connected to the prongs of plug 46. The remaining components of the network shown in FIG. 3 are identical to those shown in FIG. 2, and have been given the same reference numerals primed, the main distinction in this particular arrangement being that the meter 75′ is connected across terminals 47″ and 49″ in parallel with the potentiometer 71′, the movable arm 73′ of the potentiometer being connected directly to one side of battery 70′.

In operation, the plug 46 is first connected with the connectors of one of the electrical networks, and the switch means of the circuit is closed to initiate operation of the device.

When electrical energy is impressed upon the impedance means 60 and 65, the resistances thereof will vary in accordance with the heat thereof which is, of course, governed at the rate at which heat is dissipated from the associated body portions of the probe. The probe is simply inserted into the fluid to be tested and a reading can be taken directly from the meter of the associated electrical network.

In the above-described description of the operation of the apparatus, it has been assumed that the impedance means 60 and 65 serve as heat sources such that the body portions of the probe are at a temperature higher than the fluid to be tested whereby heat is dissipated from the associated body portion of the probe. On the other hand, it is apparent that the apparatus is equally effective in obtaining the desired measurements when the temperature of the fluid may be higher than that of the body portions of the probe or the impedance means 60 and 65. In such a case, the impedance means need not necessarily serve as a source of heat, but rather the fluid itself may provide the heat which in turn will be transferred to the body portions and heat the interior of the probe to thereby cause variation in the impedance of the impedance means. In such a case, the apparatus will serve equally as effectively to measure the heat which is being transferred from the fluid to the probe through the fluid films formed on the various surfaces of the apparatus.

In order to calibrate the apparatus, the probe may be inserted in a suitable liquid such as pure iso octane and the potentiometer is adjusted until the pointer of the meter provides a suitable reading on the face of the meter. When the apparatus is then used with other fluids, the filming properties thereof may be related to the known characteristics of the iso octane, and accordingly relative relationships can be determined. It will be found that there are both minimum and maximum readings, so that one of these may be conveniently set to the zero reading of the meter and thus a reference point is established.

When it is desired to calibrate the apparatus for gases, the probe is inserted into a gas vessel or pipe and a dry gas such as pure methane or pure hydrogen may be utilized for calibrating the device. Here again, the potentiometer may be adjusted until the indicator thereof provides a suitable reading, and subsequent readings taken with other gases will indicate deviations of purity and quality from the known characteristics of the gas used in the calibration procedures.

It is apparent from the foregoing that there is provided a new and novel apparatus for determining fluid characteristics, and that the apparatus is especially adapted for determining whether the films of a hydrocarbon fluid tend to adsorb solution gases, and whether distilled water is truly air-free and to what degree. The apparatus is also especially adapted to disclose the moisture content or wetness of a gas, and to indicate the characteristics of films which tend to condense from polluted atmospheres and the like. Furthermore, the device provides an indication of the filming charatceristics of lubricating oils. It is evident that the apparatus is quite simple, compact and inexpensive in construction, and yet is quite sturdy and reliable in operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. Apparatus for determining fluid characteristics comprising a body means including first and second portions, said first and second portions being formed of metallic and non-metallic portions respectively which provide boundary layer films of different characteristics when in the presence of a body of fluid, a first temperature-sensitive impedance means operatively associated with said first body portion and a second temperature-sensitive impedance means operatively connected with said second body portion, and measuring means connected with said impedance means for measuring the relative impedance thereof.

2. Apparatus for determining fluid characteristics comprising a body means having a first metallic portion and a second non-metallic portion which provide boundary layer films of different characteristics when in the presence of a body of fluid, a first temperature-sensitive resistor operatively associated with said first body portion, and a second temperature-sensitive resistor operatively associated with said second body portion, and an electrical measuring network operatively connected to said first and second resistors, said electrical network including a source of electrical power and a measuring means for indicating the relative resistance of said resistors.

3. Apparatus for determining fluid characteristics comprising a body means having a first metallic portion and a second nonmetallic portion, a first temperature-sensitive resistor mounted within said first portion and a second temperature-sensitive resistor mounted within said second portion, and measuring means operatively connected with said first and second resistors for measuring the relative resistance thereof.

4. Apparatus for determining fluid characteristics comprising a body means having a first hollow metallic portion and a second hollow non-metallic portion, a first temperature-sensitive resistor mounted within said first portion and a second temperature-sensitive resistor mounted within said second portion, an electrical network operatively connected with said first and second resistors, said electrical network including a source of electrical power and a measuring means for indicating the relative resistance of said resistors.

5. Apparatus as defined in claim 4, wherein said measuring means comprises a bridge circuit including an electrical meter.

6. Apparatus as defined in claim 5, wherein said bridge network includes a potentiometer for calibrating the measuring device.

7. Apparatus for determining fluid characteristics comprising a body means including a first hollow metallic portion and a second hollow non-metallic portion, a first temperature-sensitive variable resistance means mounted within said first portion, a second temperature-sensitive variable resistance means mounted within said second portion, an electrical cable means operatively connected with both of said resistance means and extending outwardly of said body means and adapted to be connected to a measuring means for indicating the relative resistance of said resistance means.

8. Apparatus for determining fluid characteristics comprising a body means, said body means including a first hollow metallic tubular portion, an end cap connected to and closing one end of said body means, an electrical cable extending through said end cap and sealed with respect thereto, said electrical cable being adapted to be connected to an electrical network, said body means including a second hollow non-metallic portion connected to said first body portion, the hollow interior of said second body portion being in communication with the hollow interior of the first body portion, a first temperature-sensitive resistor mounted within said first body portion, a second temperature-sensitive resistor mounted within said second body portion, each of said temperature-sensitive resistors being electrically connected to said electrical cable.

References Cited in the file of this patent

UNITED STATES PATENTS

| | | |
|---|---|---|
| 2,563,931 | Harrison | Aug. 14, 1951 |
| 2,811,037 | Beard | Oct. 29, 1957 |
| 2,845,790 | Eddy | Aug. 5, 1958 |